United States Patent [19]
Braasch et al.

[11] Patent Number: 5,529,697
[45] Date of Patent: Jun. 25, 1996

[54] PROCESS FOR COLOR REMOVAL FROM PAPER MILL WASTEWATERS

[75] Inventors: Dwaine A. Braasch; R. D. Ellender, both of Hattiesburg, Miss.

[73] Assignee: The University of Southern Mississippi, Hattiesburg, Miss.

[21] Appl. No.: 278,017

[22] Filed: Jul. 20, 1994

[51] Int. Cl.$^6$ ..................................................... C02F 1/52
[52] U.S. Cl. ..................... 210/710; 162/189; 210/721; 210/724; 210/737; 210/758; 210/760; 210/766; 210/917; 210/919; 210/928
[58] Field of Search .................. 162/189; 210/721, 210/724, 726, 737, 752, 758, 759, 760, 766, 917, 928, 710, 919

[56] References Cited

U.S. PATENT DOCUMENTS

| | | | |
|---|---|---|---|
| 1,768,819 | 7/1930 | Bradley et al. | |
| 1,768,820 | 7/1930 | Bradley et al. | |
| 1,768,822 | 7/1930 | Bradley et al. | |
| 1,795,757 | 3/1931 | Bradley et al. | |
| 3,483,120 | 12/1969 | Hatch | 210/721 |
| 3,531,370 | 9/1970 | Gould | 162/33 |
| 3,652,407 | 3/1972 | Paleos | 210/27 |
| 3,758,405 | 9/1973 | Fremont | 210/23 |
| 3,945,917 | 3/1976 | Foster | 210/28 |
| 3,998,730 | 12/1976 | Plotz et al. | 210/28 |
| 4,000,033 | 12/1976 | Nicolle et al. | 162/29 |
| 4,049,546 | 9/1977 | Rock | 210/30 |
| 4,069,152 | 1/1978 | Specken | 210/721 |
| 4,196,043 | 4/1980 | Singh | 162/30 |
| 4,874,521 | 10/1989 | Newman et al. | 210/639 |
| 5,032,286 | 7/1991 | Newman et al. | 210/737 |
| 5,127,992 | 7/1992 | Davies et al. | 162/29 |
| 5,190,669 | 3/1993 | Weibel | 210/759 |
| 5,194,163 | 3/1993 | Saugier | 210/759 |
| 5,326,479 | 7/1994 | Sarker et al. | 210/928 |

OTHER PUBLICATIONS

Parthasarathy, V. R., et al, "Decolourization of Pulp and Paper Mill Effluents", Int. Sem. Mgmt. Envir. Problems Pulp Paper Ind. (New Delhi), pp., 139–159, Feb. 24–25, 1982.

*Primary Examiner*—Peter A. Hruskoci
*Attorney, Agent, or Firm*—Arnold, White & Durkee

[57] ABSTRACT

Potassium permanganate is added to paper mill wastewater streams at an elevated temperature to remove color compounds from the effluent streams. The potassium permanganate causes the formation of flocculant particles which are precipitated out of the stream. This precipitate is then treated with acid to cause resolubilization.

16 Claims, 5 Drawing Sheets

PROCESS FOR COLOR REMOVAL FROM PAPER MILL WASTEWATERS

BACKGROUND

The present invention relates to processes for treating colored wastewaters from paper mills. More particularly, the present invention relates to processes for removing color from paper mill effluents and the destruction of the resultant precipitate.

A typical pulp mill is comprised of a variety of processes including wood chipping, cooking of the chips (the kraft sulfite process) to extract cellulose and hemicellulose (and to discard the lignin components), and bleaching to produce white pulp and/or paper. The pulp bleaching sequence commonly employs strong oxidants such as chlorine or chlorine dioxide which react with the lignin to make it water soluble. These components when mixed with the residual sulfite liquor from the pulping process produce a black, chemically undefined liquid which requires further wastewater treatment.

The bleach plant effluent stream (referred to herein as "E1"), commonly known as the E1 caustic sewer, generally has a high temperature ($\approx 70°$ C.) and pH ($\approx 10.5$). When softwoods are being treated, the effluent can be referred to as SE1. The effluent can be referred to as HE1 when hardwoods are being treated. The bleaching sequence also uses an acid wash which results in a second effluent stream, the acid sewer.

Typically, the acid and E1 sewers are mixed and then treated by conventional wastewater processes such as activated sludge, settling basins, secondary clarifiers, and other solids removal processes. These treatments decrease the carbon load ($BOD_5$), remove phosphates and other eutrophying chemicals, but have no appreciable effect on color reduction.

An additional wastewater stream, the process sewer, is the second most concentrated source of color. This wastewater is comprised of spills and overflows from all other processes within the paper mill.

The color component in these wastewaters is refractory to the usual degradative processes. It results from a combination of conjugated ring structures (lignin) and the sulphates(ites) attached to the ring structures. Wastewater color exists in the form of colloidal particles (chromophores) with varying sizes and molecular weights. A smaller portion of the color is soluble in water and represents liberated, low molecular weight single ring structures. The chromophores and low molecular weight phenolics absorb ultraviolet light through conjugated double bond configurations, six carbon aromatic rings, nitrogen, sulphur and oxygen containing groups and heterocyclic compounds containing oxygen, nitrogen or sulphur. The colored effluent of a mill is composed of wood extractables and lignin degradation products formed during pulping and bleaching. A variety of condensation and oxidation reactions occur during cooking, and during chlorination or color extraction from pulp, producing quinoid structures. These structures are responsible for color absorbance in the visible spectrum. Since conventional wastewater treatment processes have no appreciable effect on color reduction, the color components remain in suspension/solution and are ultimately discarded into rivers or streams.

There are several problems associated with discharging colored wastewaters into the environment. First, they deteriorate the aesthetic appearance of the receiving streams and inhibit plant photosynthesis. This results in oxygen deficiency within the receiving stream which affects aquatic life forms.

Various processes have been developed or proposed to remove color from paper mill wastewaters. A number of these processes are discussed generally by V. R. Parthasarathy et al., "Decolorization of Pulp and Paper Mill Effluents." Int. Sem. Mgmt. Envir. Problems Pulp Paper Ind. (New Delhi) pp. 139–159, Feb. 24–25, 1982, and are examined in more detail below. These processes include (1) massive lime treatment of the effluent, (2) alum co-precipitation or precipitation with iron, salts and lime, (3) chemical oxidation using either potassium permanganate, oxygen, ozone or hydrogen peroxide, (4) adsorption/absorption on activated charcoal, (5) reverse osmosis/electrodialysis, (6) bio-genetics, (7) iron flotation or foam separation techniques, and (8) biological treatment.

In massive lime treatment, color imparted substances in the wastewater are deposited upon solid phase calcium hydroxide containing particles. These particles then need to be separated from the remaining wastewater and dewatered. The separation and dewatering steps are difficult to perform effectively and require a substantial amount of energy.

In the alum co-precipitation process, the alum ($Al_2(SO_4)_3$) or iron salts (either $FeCl_3$ or $Fe_2(SO_4)_3$) act as both flocculating and precipitating agents. Although the use of alum for color removal is relatively cheap, the sludge is difficult to handle and cannot be disposed of directly as landfill. The iron salts are inefficient in removing color at low concentrations. However, increasing the concentration of these salts can actually increase the color level in the water because of the dissolved iron compounds. Further, while this technology is commonplace in the industry today, it is effective in only a narrow pH range (5.0–7.0). If the pH of the wastewater to be treated does not fall within this range, much of the alum is wasted in lowering the pH into the effective range which reduces the efficiency of the overall reaction. After solids settling, should the pH of the solution change, there exists the potential for particle resuspension.

In the chemical oxidation processes, oxidizing agents such as potassium permanganate, hydrogen peroxide, or ozone are added to the wastewater. The use of potassium permanganate is said to generate manganese dioxide which is brownish in color and water insoluble. The Parthasarathy article states "potassium permanganate has the lowest oxidation potential (0.59 mV) and generates $MnO_2$ upon dissociation. $KMnO_4$ is an active decolourization agent and it principally attacks the C=C and breaks it through oxidation. But, the ultimate product $MnO_2$ is brownish colour and a water insoluble product. The finely dispersed brownish manganese dioxide has to be eliminated from the effluent by a final filtering process, which causes further complications." Although the Parthasarathy reference associates $KMnO_4$ and active decolorization, it states that it produces a water insoluble product which complicates the filtration process, which appears to discredit the value of the reaction.

Hydrogen peroxide can also be added to the wastewater to remove color but requires a very long contact time for effective removal because the process relies on kinetic interaction between the peroxide and the chemical to be oxidized.

Ozone has also been studied as a possible oxidant for wastewaters and also relies on specific kinetic interactions which are primarily responsible for the cleavage of double bonds integral to aromatic ring structures. An example of a process that utilizes a combination of ozone and hydrogen peroxide for decolorizing lignin-containing aqueous solutions is disclosed in U.S. Pat. No. 5,190,669 to Weibel. One of the major problems associated with peroxide and ozone processes is the high expense necessary to employ the processes on a large scale.

In the adsorption and absorption processes, color removal is generally achieved through the use of either granular or powdered activated carbon. While this process has been shown to be effective in removing limited amounts of color, the quantity of activated carbon required for treatment of wastewaters from a paper mill is large and prohibitive to operate on a commercial scale.

The processes of reverse osmosis and electrodialysis have also been studied as potential techniques to remove color from spent liquors from pulp mill operations. Reverse osmosis has been primarily used in desalination of waters for the production of potable water and has been applied only minimally to other processes. Electrodialysis is complicated by the presence of multiple depolarizing agents inherent in the liquor which results in incomplete separation of compounds. To remedy this shortcoming, "ultrafiltration" has been used to completely separate compounds based on molecular weight. Though separation is more complete, the process is not commercially feasible due to the fragile nature of the membranes and the cost associated with the production of a filtration system capable of handling the large volumes associated with pulping processes.

The use of white rot fungus for the bio-genetic degradation of lignin has been studied. This technology involves expression of genes which code for ligninolytic enzymes. Wood chips are pretreated with fungal medium containing the secreted enzyme in hopes of reducing the amount of bleaching required. Fungal cultures have been shown to require additional carbon sources and in many cases demand nitrogen depleted environments to actively produce ligninase. Lignin degrading enzymes are produced during secondary metabolic processes and are present at low concentrations. Few established molecular biology protocols exist for the manipulation of fungal genes other than yeast. This area could be rapidly improved if the genes of the ligninolytic enzymes could be placed under the control of primary metabolic regulation to increase the level of production. Even if this were achieved, the method is limited by the rapid degradation of the enzymes at the temperatures used in the bleaching process.

Ion flotation or foam separation techniques have also been studied and have gained much attention in recent years. While the ion flotation technique appeared to be successful, its drawbacks are a very high installation cost as well as high operating costs.

Another process for removing color from wastewater is disclosed in U.S. Pat. No. 5,194,163 to Saugier. This patent discloses a process for decolorizing lignin containing aqueous solutions by the addition of peracetic acid or monoperoxysulfuric acid.

While many different processes have been proposed or experimented with, none has yet proven to provide an effective yet practicable solution to the problem of color removal. Accordingly, it would be a significant advancement in the art to provide a process for the removal of color from paper mill wastewaters which is both effective and economically feasible. It would be an even further advance if such a process could also produce a precipitate-free effluent. Such a process is disclosed and claimed herein.

SUMMARY OF THE INVENTION

The present invention provides a process for removing color from paper mill effluents and the subsequent solubilization of the color precipitate from paper mill wastewaters. The process comprises adding an effective amount of potassium permanganate to oxidize and precipitate the color compounds while maintaining the wastewater stream above about 45° C. The precipitate is concentrated and then solubilized by the addition of acid.

The addition of the potassium permanganate causes a precipitate to form which can be separated from the supernatant in a retention basin for further processing. In the preferred embodiment, the precipitate is treated with acid sewer and concentrated acid such as 36N sulfuric acid to solubilize the precipitate.

The present invention can be used to treat any colored wastewater in a paper mill including the E1 wastewater, the acid sewer and the process sewer.

DETAILED DESCRIPTION OF THE PREFERRED EMBODIMENTS

The present invention provides a process for removing color from paper mill wastewaters and the destruction of the resultant precipitate. The invention can best be understood by reference to FIG. 1 which illustrates a preferred embodiment of the present invention.

Figure 1:
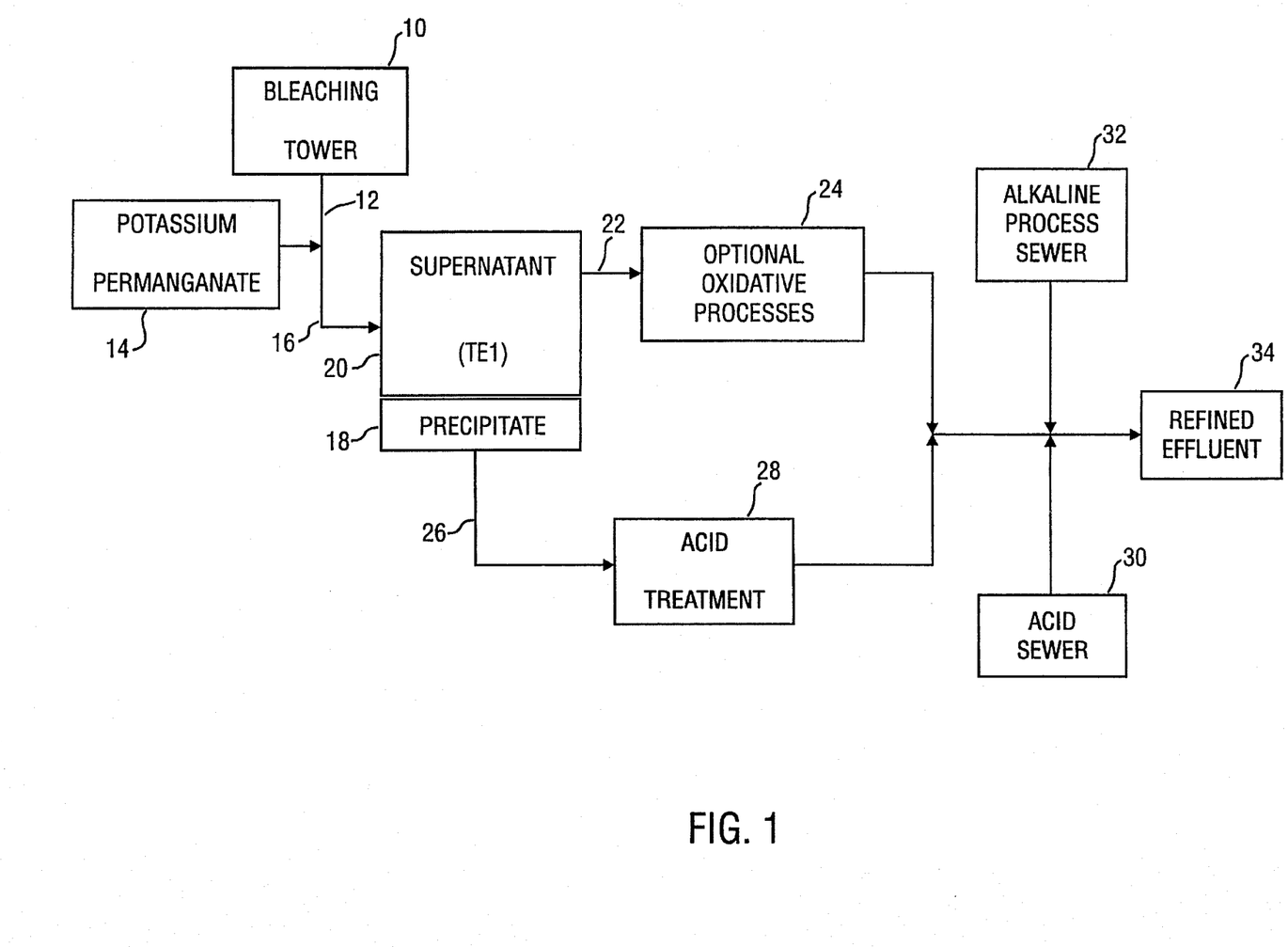
FIG. 1 is a schematic of the process flow for a preferred embodiment of the present invention.

E1 wastewater is removed from a bleaching tower 10 through line 12 for processing.

Potassium permanganate from a supply tank 14 is added to this wastewater in line 12 in an amount sufficient to remove the desired amount of color. In one preferred embodiment, 0.7 grams of potassium permanganate are added to treat 100 ml of SE1. This amount can be increased if the effluent contains more color components or if a greater degree of color removal is desired. Conversely, less potassium permanganate can be added if there is less initial color to remove or if a lesser degree of color removal is acceptable. The effects of adding differing amounts of potassium permanganate are discussed in greater detail below.

The temperature of the E1 effluent in a Kraft paper mill is normally about 70° C. In the preferred embodiment, this temperature is maintained above about 45° C. during addition of potassium permanganate.

The E1 wastewater is then discharged into a retention basin 16 where a precipitate 18 is allowed to separate from a supernatant 20. By adding the potassium permanganate to the wastewater at an elevated temperature, it has been found that larger floc particles are formed which results in easier separation of the precipitate from the supernatant.

The supernatant 20 is removed from the retention basin 16 through line 22. It can optionally then be treated with other oxidative processes in reactor 24 to remove additional color.

In one preferred embodiment it receives a further treatment with ozone to remove additional color. The treated supernatant generally has a pH of about 10.

The precipitate 18 is removed from the retention basin 16 through line 26 and is further treated with acid in chamber 28 to cause solubilization. Preferably the precipitate is concentrated or packed before further processing. This can be accomplished by gravity in a suitable basin or by an appropriate filtering system. In one preferred embodiment, an acid sewer (pH 2.0; HCl base) is added to the precipitate and supplemented with a small amount of concentrated sulfuric acid. In one preferred embodiment for acid solubilization, the precipitate is packed by filtering it through a Gore-Tex sock filter and the mixing ratio of acid sewer, precipitate and concentrated sulfuric acid is 80:1:6.25. It will be appreciated by those skilled in the art that other acids, such as nitric acid and hydrochloric acid, can also be used to resolubilize the precipitate. This reaction can be enhanced by the addition of sodium citrate and/or hydrogen peroxide ($\geq$30%).

The oxidized supernatant from reactor 24, the acid solubilized precipitate from reactor 28, additional acid sewer 30 and alkaline process sewer 32 can then be combined to produce a refined effluent 34. In the preferred embodiment the proportion of acid solubilized precipitate (ASP), acid sewer 30, oxidized supernatant and the alkaline process sewer 32 in refined effluent 34 is 1:1.4:0.45:6.9.

While the illustrated embodiment has been described in terms of the E1 wastewater, it will be appreciated by those skilled in the art that the process of the present invention can also be used to treat other colored process streams and colored wastewaters such as the acid sewer and the process sewer.

Further aspects of the invention are illustrated by the following examples.

EXAMPLES 1–4

Small Volume Experiments

A fresh SE1 sample from a Kraft paper mill plant was collected and transported to the laboratory for analysis. Portions of the sample were placed in Nalgene bottles and kept in a water bath set at 70° C.

The testing apparatus was set up by placing a 600 ml beaker on top of a heated stir plate. A sufficient volume of water was added to the beaker such that when a 125 ml Erylenmeyer flask containing 100 ml of SE1 was placed in the beaker, it raised the volume to approximately 300 ml by the calibration on the side of the beaker.

For the data recorded in these examples, 100 ml samples of SE1 were measured into clean 125 ml Erylenmeyer flasks and placed in the beaker of heated water on the stir plate. The temperature of each sample was monitored and the settings on the heater were adjusted to achieve the desired sample temperature. When the appropriate temperature was achieved and maintained, the stir plate was activated to the lowest setting to begin agitation of the sample.

The specified amount of potassium permanganate was then added and a high intensity antenna illuminator (Cole Parmer) was shown on the sample vessel to facilitate observation of the formation of large flocculant material. The large flocculant formation occurred very rapidly; almost instantaneously. A laboratory timer was activated upon addition of the permanganate and the timer was stopped upon first visualization of large flocculant precipitate. The sample flask was then removed from the heated water and allowed to cool to room temperature. After cooling, a 10 ml aliquot was removed and filtered through a 0.45 µm syringe filter (MSI) and collected in a scintillation vial. The vials were stored at 4° C. until they were analyzed for color level by absorbance at 465 nm on a Beckman DU60 spectrophotometer.

The first set of samples were all precipitated at 50° C. Different amounts of potassium permanganate were added to the various samples. The time required for precipitation and the absorbance at 465 nm were measured for each sample. The results are set forth in Table 1 and are plotted in FIG. 2.

TABLE 1

| | Temp 50° C. | |
|---|---|---|
| grams Pp/100 ml | Time (sec) | A465 |
| 0.00 | 0 | 3.0678 |
| 0.25 | 33 | 1.6107 |
| 0.50 | 76 | 0.9437 |
| 0.75 | 90 | 0.4592 |
| 1.00 | 400 | 0.2427 |

Figure 2:
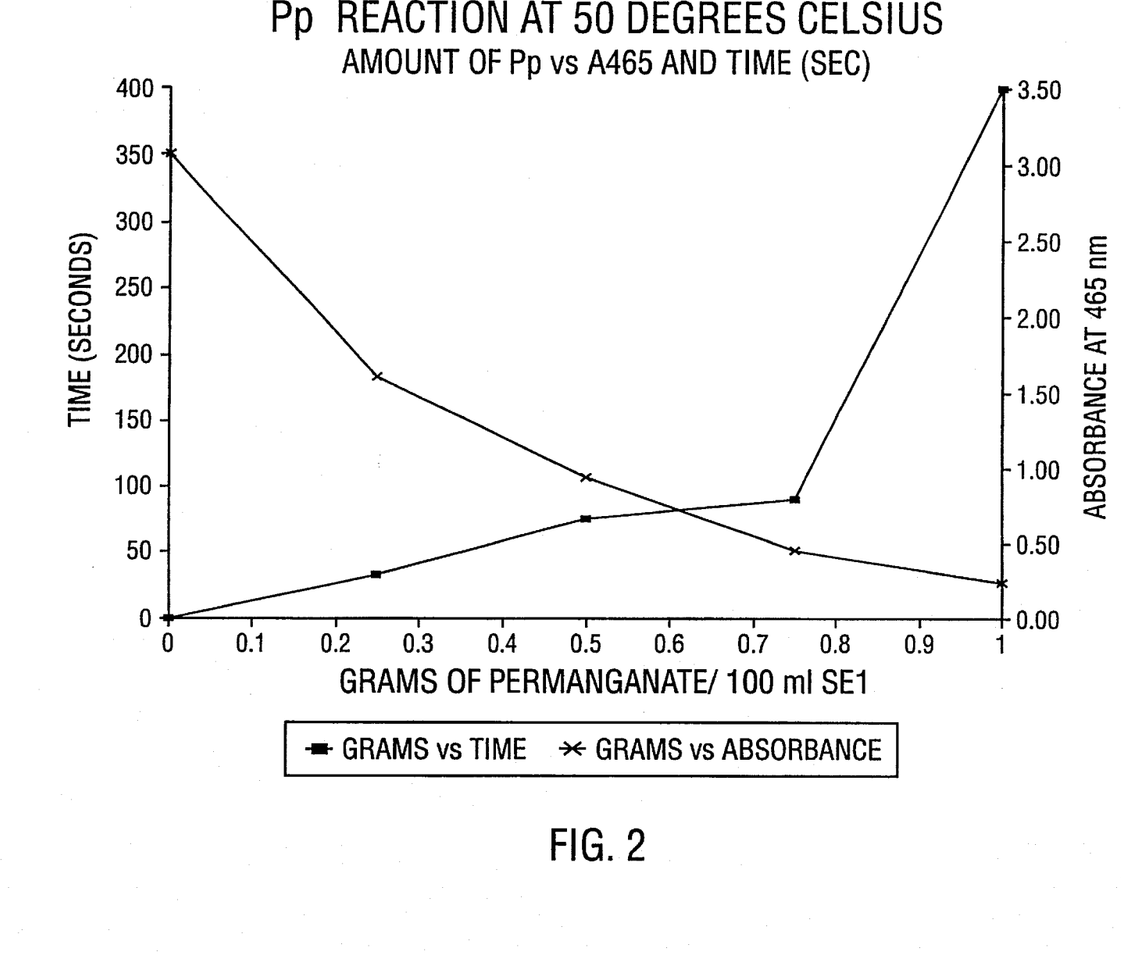
FIG. 2 is a graph showing grams of potassium permanganate added to 100 ml of SE1 at 50° C. versus time and versus absorbance at 465 nm.

These data indicate that the reaction time at this temperature is composed of two elements. First, time is required for the solubilization of permanganate in SE1. Second, time is required for the actual reaction of the permanganate with the color component in SE1. FIG. 2 shows that the time of permanganate solubilization above 0.75 grams/100 ml is substantially greater than at lower concentrations. An indication of the second element of the reaction is shown by the line designated grams versus absorbance. These data indicate that if given sufficient time, the reaction to precipitate the color component will go virtually to completion. The intersection of the two lines in FIG. 2 suggests that at 50° C. an optimal concentration of permanganate for this SE1 sample would be about 0.63 grams per 100 ml and would achieve an absorbance of approximately 0.7 (calculated to be a 78% color reduction).

Figure 3:
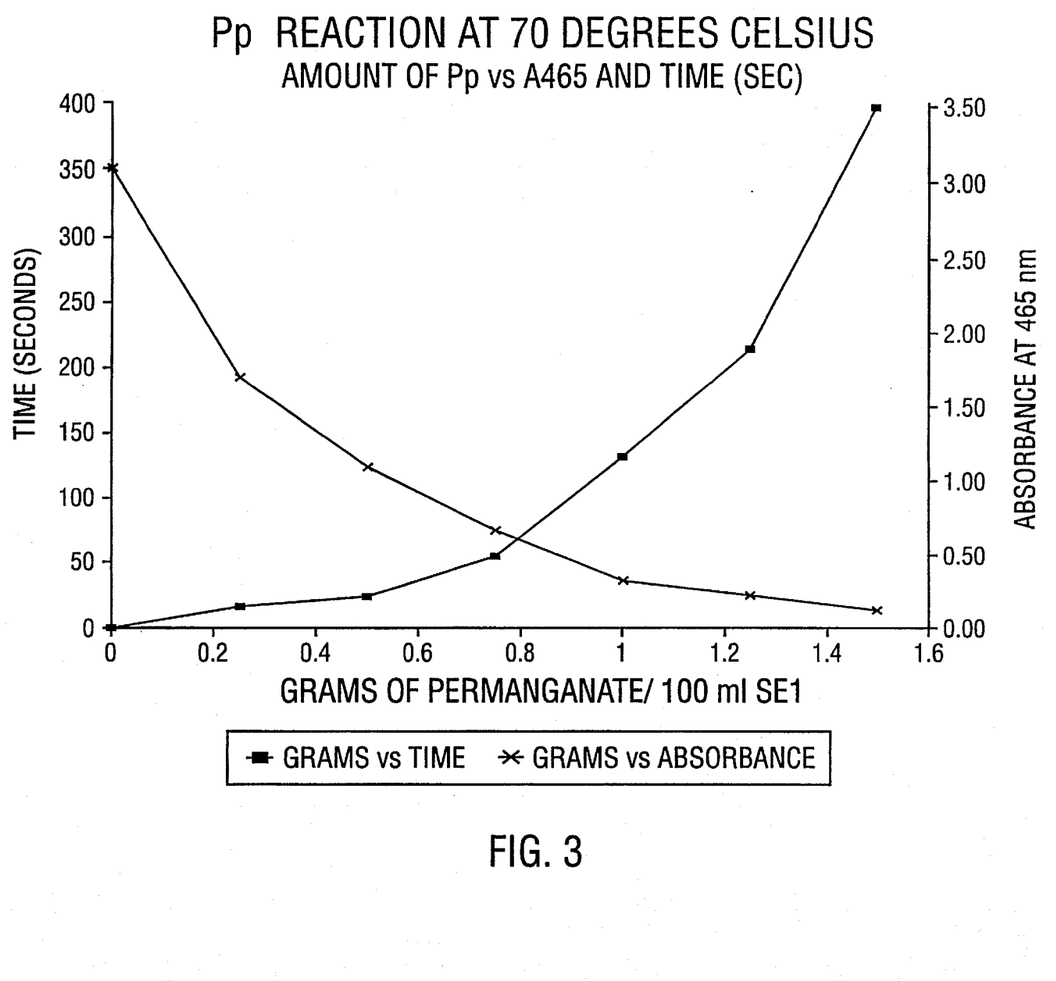
FIG. 3 is a graph showing grams of potassium permanganate added to 100 ml of SE1 at 70° C. versus time and versus absorbance at 465 nm.

In the second set of measurements, the same procedure was followed as in the previous experiments except that the sample was maintained at 70° C. The measurements are summarized in Table 2 and are plotted in FIG. 3.

TABLE 2

| | Temp 70° C. | |
|---|---|---|
| grams Pp/100 ml | Time (sec) | A465 |
| 0.00 | 0 | 3.0678 |
| 0.25 | 17 | 1.695 |
| 0.50 | 24 | 1.0955 |
| 0.75 | 56 | 0.667 |
| 1.00 | 134 | 0.3277 |
| 1.25 | 217 | 0.2305 |
| 1.50 | 400 | 0.1285 |

These data demonstrate that at the elevated temperature, solubility of the permanganate increases but the reaction time is not significantly affected. The intersection of the points in FIG. 3 suggests that an optimal concentration of permanganate at 70° C. would be about 0.78 grams per 100 ml to achieve an absorbance of 0.6 (calculated to be an 80.4% color reduction).

A third set of experiments was performed using a constant concentration of 0.7 grams of potassium permanganate per 100 ml of SE1. These samples were tested at various temperatures from 30° to 70° C. The results are tabulated in Table 3 and are plotted in FIG. 4.

TABLE 3

| 0.7 gm Pp/100 ml SE1 | | |
| --- | --- | --- |
| Temp. Celsius | Time (sec) | A465 |
| 30 | 988 | 0.4394 |
| 45 | 186 | 0.4685 |
| 50 | 106 | 0.5124 |
| 60 | 69 | 0.6084 |
| 70 | 42 | 0.8223 |

Figure 4:
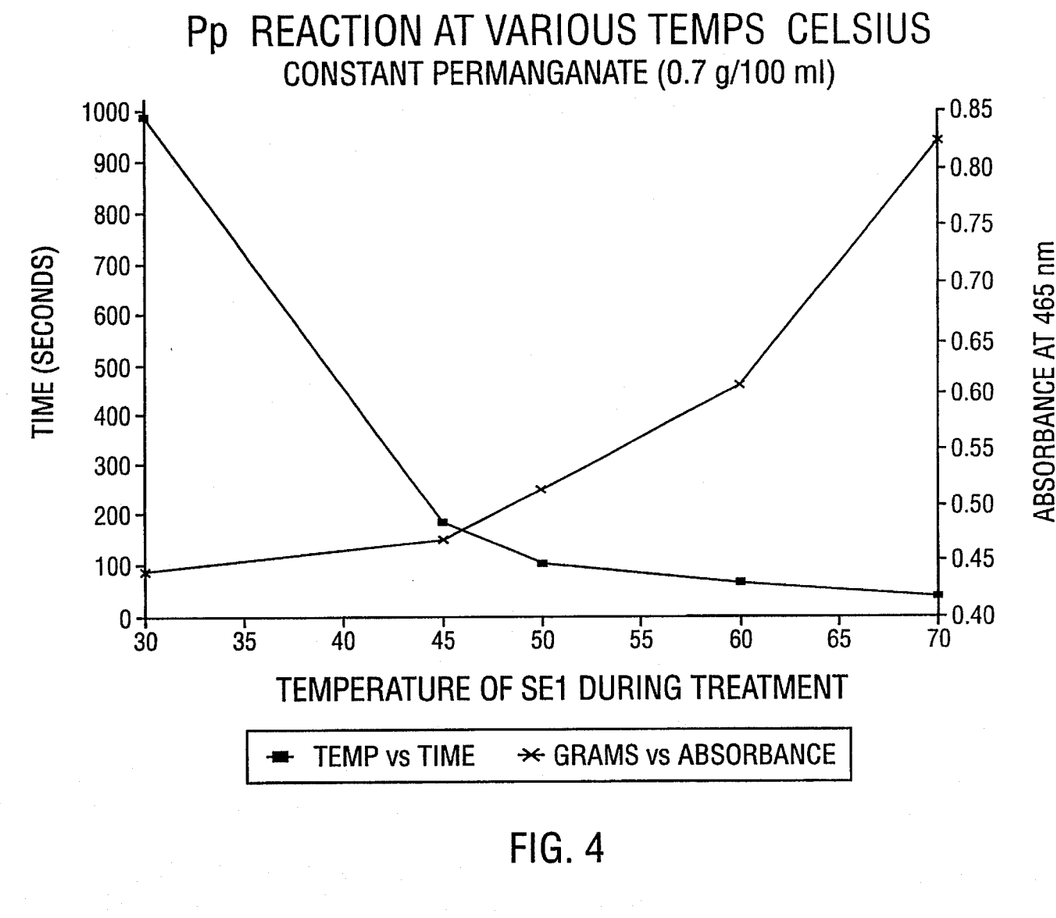
FIG. 4 is a graph showing the temperature of SE1 during treatment with 0.7 grams of potassium permanganate per 100 ml of SE1 versus time and versus absorbance at 465 nm.

FIG. 4 demonstrates that at a constant concentration of 0.7 grams per 100 ml, the minimal temperature for enhanced flocculation is about 45° C. as determined by the intersection of the two lines.

In a fourth set of measurements, an 80 liter fresh SE1 sample from a Kraft paper mill process was collected. The sample was placed in a 100 liter chamber and heated to 70° C. Five hundred and sixty grams of potassium permanganate (7 grams per liter) were added to the sample and mixed until floc formed. The precipitate was removed by gravity in a waste removal system.

Figure 5:
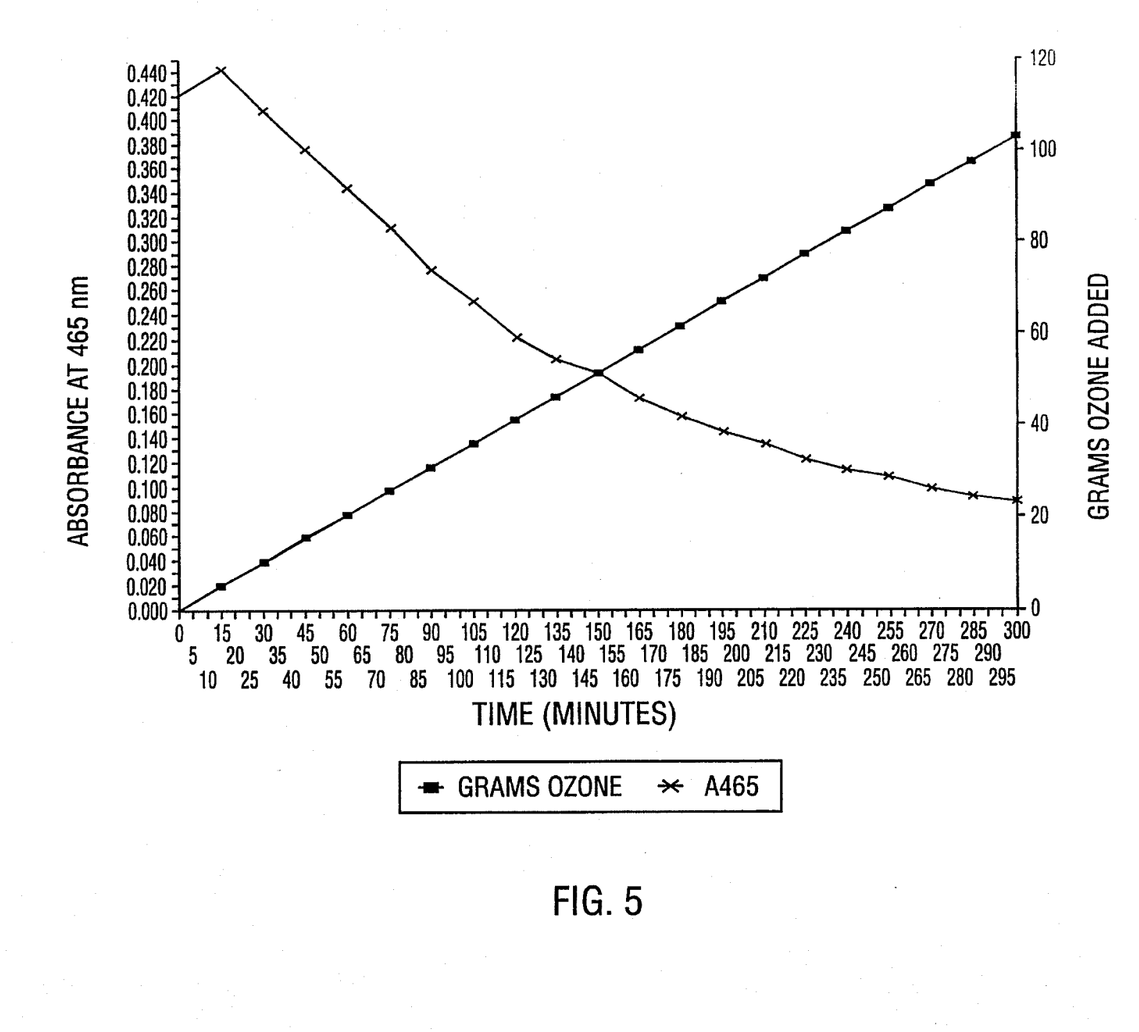
FIG. 5 is a graph demonstrating the decrease in absorbance at 465 nm vs time and ozone concentration vs time.

20 liters of recirculating supernatant from this sample (with an initial absorbance of 0.42) were treated continuously with ozone (0.341 grams per minute) generated by the passage of extra dry oxygen through a corona discharge device. FIG. 5 is a plot of the grams of ozone added versus time and the absorbance versus time. The optimum time and or amount of ozone necessary to reduce the absorbance at 465 nm by approximately 50% is depicted by the intersection of the lines in FIG. 5.

EXAMPLE 5–6

Large Volume Experiments

An 80 liter fresh SE1 sample from a Kraft mill process was collected and transported to the laboratory. Large volumes of acid sewer and process sewer were also collected. The SE1 was placed in a 100 liter chamber and heated to 70° C. The SE1 was mixed with 7 grams per liter $KMnO_4$ and mixed until floc formed. The precipitate was separated from the supernatant (TSE1) by gravity in a waste removal system (Aquatic Ecosystems, Inc.). The concentrated precipitate was collected and placed into a 100 liter acid resistant chamber. Sufficient concentrated sulfuric acid was added to dissolve the precipitate. This mixture was termed acid solubilized precipitate (ASP).

The supernatant (TSE1) was placed in a third 100 liter chamber and treated with ozone to degrade the residual color components. Ozone treated softwood E1 is referred to as OTSE1.

OTSE1, ASP and acid sewer were mixed in approximately equal volumes in a basin to produce a refined effluent termed RE. The results of this experiment are presented in Table 4. The COD and BOD values were determined using standard techniques set out in Standard Methods for the Examination of Water and Wastewater, 17th Ed., published by the American Public Health Association.

TABLE 4

| Sample | Absorbance 465 nm | COD (mg/L) | BOD (mg/L) |
| --- | --- | --- | --- |
| SE1 | 2.700 | 4325 | 820 |
| TSE1 | 0.247 | 2897 | 576 |
| OTSE1 | 0.227 | 2468 | 414 |
| Acid Sewer | 0.291 | 1550 | 623 |
| ASP | N/A | N/A | N/A |
| Refined Effluent | 0.130 | 1714 | 340 |

In a modification of the above experiment, 5 grams per liter of $KMnO_4$ was added to the 80 liters of SE1 at 70° C. The supernatant was separated from the precipitate by filtration through a four foot Gore-Tex polypropylene felt sock membrane. The filtration step allowed the concentration of precipitate to 2 liters. To produce ASP, 400 ml of the precipitate were placed in the ASP chamber and the sock filter was washed with 32 liters of acid sewer into the ASP chamber as well. To this mixture of precipitate and acid sewer, 2.5 liters of 36N sulfuric acid was added to complete solubilization. A refined effluent was formed by mixing together the solutions according to the following percentages: 5% OTSE1, 20% ASP, 75% process sewer. The results of these experiments are described in Table 5.

TABLE 5

| Sample | Absorbance 465 nm | COD (mg/L) | BOD (mg/L) |
| --- | --- | --- | --- |
| SE1 | 2.080 | 4592 | 822 |
| TSE1 | 0.656 | 3535 | 792 |
| OTSE1 | 0.314 | 3657 | 700 |
| ASP | 0.018 | 1747 | 896 |
| Refined Effluent | 0.021 | 731 | 782 |

While the present invention has been described with respect to the presently preferred embodiments, it will be appreciated by those skilled in the art that the processes of the present invention may be embodied in other specific forms without departing from their spirit or essential characteristics. For example, other wastewater streams can be treated with the process of the present invention. Additionally, the amount of ozone treatment or other secondary treatments can be varied or added. The described processes are, therefore, considered to be in all respects only as illustrative and not restrictive. The scope of the invention is, therefore, indicated by the appended claims rather than by the foregoing description. All modifications or changes which come within the meaning and range of equivalency of the claims are to be embraced within their scope.

We claim:

1. A process for removing color from paper mill wastewaters comprising:

obtaining a paper mill wastewater stream having a color component to be removed;

adding an effective amount of potassium permanganate to said stream while maintaining it at a temperature above 45° C. to form a precipitate including flocculant particles and a supernatant having a lower color level than said stream;

separating the precipitate from the supernatant;

dissolving the precipitate in acid; and mixing the supernatant and dissolved precipitate to form a refined effluent.

2. A process for removing color from paper mill wastewaters as defined in claim 1 wherein the supernatant, the dissolved precipitate, an acid sewer wastewater and a process sewer wastewater are mixed to form a refined effluent.

3. A process for removing color from paper mill wastewaters as defined in claim 1 wherein said acid comprises an acid sewer wastewater from said paper mill.

4. A process for removing color from paper mill wastewaters as defined in claim 3 wherein said acid further comprises a concentrated acid selected from the group consisting of sulfuric acid, nitric acid and hydrochloric acid.

5. A process for removing color from paper mill wastewaters as defined in claim 1 wherein the acid is selected from the group consisting of sulfuric acid, nitric acid and hydrochloric acid.

6. A process for removing color from paper mill wastewaters as defined in claim 5 wherein said acid comprises sulfuric acid.

7. A process for removing color from paper mill wastewaters as defined in claim 1 wherein said wastewater stream comprises a discharge from a bleaching tower.

8. A process for removing color from paper mill wastewaters as defined in claim 1 wherein said wastewater stream comprises an acid sewer wastewater.

9. A process for removing color from paper mill wastewaters as defined in claim 1 wherein said wastewater stream comprises a process sewer wastewater.

10. A process for removing color from paper mill wastewaters as defined in claim 1 wherein said process further comprises treating said supernatant with ozone to remove additional color.

11. A process for removing color from paper mill wastewaters as defined in claim 1 wherein said temperature is maintained at about 70° C. during addition of the potassium permanganate.

12. A process for removing color from paper mill wastewaters comprising:

obtaining a paper mill wastewater stream having a color component to be removed;

adding an effective amount of potassium permanganate to said wastewater at a temperature above 45° C. to form a precipitate including flocculant particles and a supernatant;

separating said precipitate from said supernatant;

treating said supernatant with ozone to remove color from said supernatant;

treating said precipitate with a concentrated acid solution to effect resolubilization of said precipitate; and mixing the supernatant and resolubilized precipitate to form a refined effluent.

13. A process for removing color from paper mill wastewaters as defined in claim 12 wherein said acid is selected from the group consisting of sulfuric acid, nitric acid and hydrochloric acid.

14. A process for removing color from paper mill wastewaters as defined in claim 12 wherein said acid comprises sulfuric acid.

15. A process for removing color from paper mill wastewaters as defined in claim 12 wherein said stream is maintained at a temperature of about 70° C. during addition of the potassium permanganate.

16. A process for removing color from paper mill wastewaters comprising:

obtaining a paper mill wastewater stream having a color component to be removed;

adding an effective amount of potassium permanganate to said stream while maintaining the temperature at about 70° C. to form a precipitate including flocculant particles;

separating said precipitate from a supernatant;

treating said precipitate with an acid solution to affect resolubilization of said precipitate; and mixing the supernatant and resolubilized precipitate to form a refined effluent.

* * * * *